(12) United States Patent
Hankin et al.

(10) Patent No.: US 10,304,426 B2
(45) Date of Patent: May 28, 2019

(54) INSTRUMENT AND RELATED NOTATION AND METHODS

(71) Applicants: Wayne Hankin, Newport, VT (US); Roy Sansom, Belmont, MA (US)

(72) Inventors: Wayne Hankin, Newport, VT (US); Roy Sansom, Belmont, MA (US)

(*) Notice: Subject to any disclaimer, the term of this patent is extended or adjusted under 35 U.S.C. 154(b) by 0 days.

(21) Appl. No.: 15/678,786

(22) Filed: Aug. 16, 2017

(65) Prior Publication Data
US 2019/0057675 A1 Feb. 21, 2019

(51) Int. Cl.
G10D 7/04 (2006.01)
G09B 15/02 (2006.01)
G10D 7/02 (2006.01)
G09B 19/02 (2006.01)

(52) U.S. Cl.
CPC .............. *G10D 7/04* (2013.01); *G09B 15/02* (2013.01); *G09B 15/026* (2013.01); *G10D 7/02* (2013.01); *G09B 19/02* (2013.01)

(58) Field of Classification Search
CPC ...... G09B 19/02; G09B 15/026; G09B 15/02; G10D 7/02; G10D 7/04
See application file for complete search history.

(56) References Cited

U.S. PATENT DOCUMENTS

| | | |
|---|---|---|
| 682,015 A | 9/1901 | Adams |
| 1,768,706 A | 7/1930 | Miller |
| 1,788,613 A | 1/1931 | Bernard |
| 2,145,605 A | 1/1939 | Mausolf |
| 2,194,332 A | 3/1940 | Sumner |
| 2,195,992 A | 4/1940 | Mausolf |
| 2,271,772 A | 2/1942 | Maffei |
| 2,460,931 A | 2/1949 | Gretsch |
| 2,485,749 A | 10/1949 | Ladd |
| 3,934,357 A | 1/1976 | Couvillion |
| 4,445,869 A | 5/1984 | Wasserman |
| 4,819,539 A | 4/1989 | Searing |
| 4,893,541 A | 1/1990 | Fowler |
| 5,254,008 A | 10/1993 | Dawson |
| 5,597,968 A | 1/1997 | Okamoto |
| D389,855 S | 1/1998 | Druz |
| 5,885,127 A * | 3/1999 | Colyer ............ A01M 31/004 446/208 |

(Continued)

FOREIGN PATENT DOCUMENTS

JP H10222157 A 8/1998

*Primary Examiner* — Kimberly R Lockett
(74) *Attorney, Agent, or Firm* — Lambert Shortell & Connaughton; Gary E. Lambert; David J. Connaughton, Jr.

(57) ABSTRACT

A closed end woodwind instrument is provided designed for use with an inventive teaching method, notation system, and repertory. The combined system is designed for teaching basics of music and to provide a simple, convenient and enjoyable instrument. The instrument is formed of a body, which defines an internal cavity. A mouthpiece has a windway that connects to the internal cavity. The windway allows a user to blow air through the mouthpiece into the cavity and through the instrument. A labium is positioned along the windway, such that it splits air flowing through the windway. A plurality of tone holes are in communication with the internal cavity to allow air to exit the cavity. Upon blocking or opening these tone holes, different tones can be produced by the instrument.

8 Claims, 8 Drawing Sheets

(56) References Cited

U.S. PATENT DOCUMENTS

| | | | |
|---|---|---|---|
| 6,015,947 | A | 1/2000 | Moberg |
| 6,348,647 | B1 * | 2/2002 | Ahrens .................... G10D 7/02 84/380 R |
| 6,388,182 | B1 | 5/2002 | Bermudez |
| 6,476,303 | B1 | 11/2002 | Mutou et al. |
| 6,588,756 | B1 | 7/2003 | Hughes |
| 6,616,455 | B1 | 9/2003 | Allen, Sr. |
| 6,872,876 | B2 | 3/2005 | Ahrens |
| 6,914,179 | B2 | 7/2005 | Ahrens |
| 6,967,274 | B2 | 11/2005 | Ross |
| 6,987,220 | B2 | 1/2006 | Holcombe |
| 7,005,569 | B2 | 2/2006 | Feidner |
| 7,439,438 | B2 | 10/2008 | Hao |
| 7,453,036 | B1 | 11/2008 | Henkel |
| 7,482,524 | B1 | 1/2009 | Hanigton |
| 7,767,895 | B2 | 8/2010 | Johnston |
| 7,816,595 | B1 | 10/2010 | Dietrich |
| 8,039,722 | B2 | 10/2011 | Maccoy |
| 8,222,507 | B1 | 7/2012 | Salazar |
| 8,258,388 | B2 | 10/2012 | Hind |
| 8,304,642 | B1 | 11/2012 | Bryan |
| 9,123,315 | B1 | 9/2015 | Bachand |
| 9,368,093 | B2 | 6/2016 | Bachand |
| 2003/0192421 | A1 | 10/2003 | Ahrens |
| 2009/0266222 | A1 | 10/2009 | Epstein |
| 2012/0135789 | A1 | 5/2012 | Feidner |
| 2013/0319207 | A1 | 12/2013 | King |
| 2015/0221231 | A1 | 8/2015 | Ua-Aphithorn |

* cited by examiner

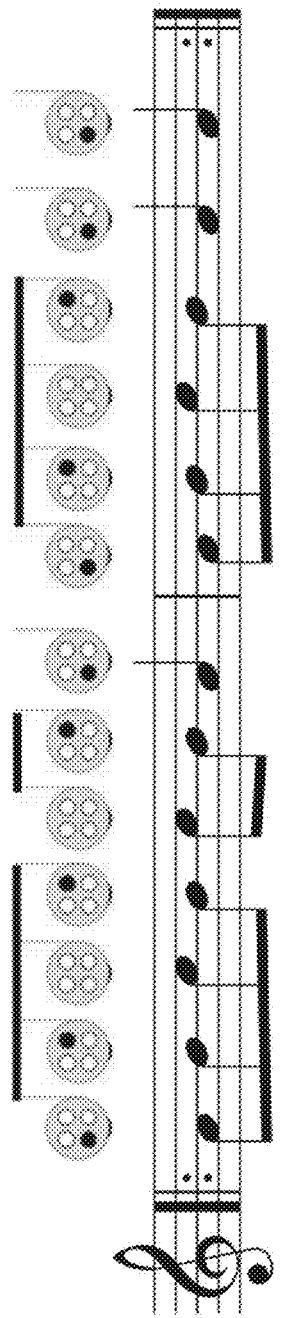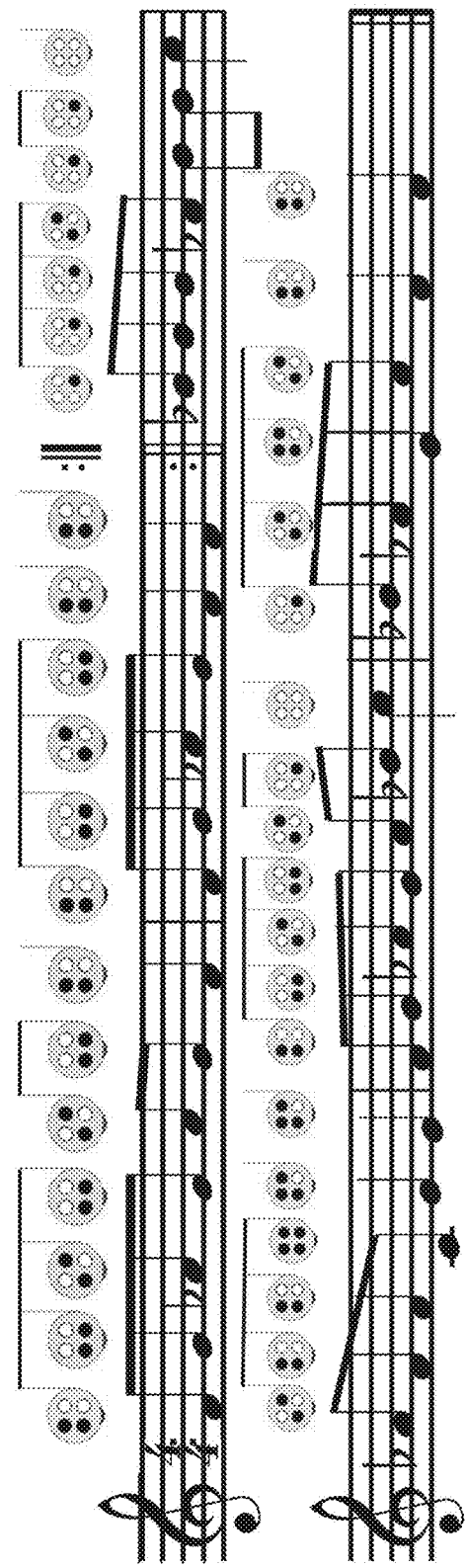
Figure 8
Figure 9

INSTRUMENT AND RELATED NOTATION AND METHODS

BACKGROUND OF THE INVENTION

Field of the Invention

The present invention relates generally to a closed end woodwind instrument and related methods. More particularly the present invention relates to a simple four-tone hole closed end woodwind instrument plus related notation, teaching, and playing methods.

Description of Related Art

In open-ended woodwind instruments, sound is produced by the player's air focused into a hole called the windway opening. Pitches which resonance occurs depends on the opening and closing of finger holes in the "air column" where wind travels through the instrument. In such woodwinds, the distance air travels through a bore and varied by the opening and closing of holes along the body of the instrument, providing different resonance frequencies. Coupling efficiency affects instrument responsiveness (the ease in which the instrument produces a desired tone in response to the efforts of the musician).

Closed-end flutes are characterized by an enclosed hollow body chamber instead of an open-ended bore to produce sound. Different notes are produced by covering and uncovering finger holes. Some of these closed-end types were capable of producing a diatonic scale and/or chromatic scale. Multiple chamber vessel flutes can play diatonically or chromatically reaching ranges two octaves or greater. Many of these flutes go as far back as 30,000 years and have been made in clay, porcelain, metal, wood and plastic.

Origins of first use confined these devices as signal whistles. Technically they were not true musical instruments because they lacked features unlike other instruments that would evolve into more sophisticated devices used in orchestras, wind bands, and other ensembles. This lack of features for such whistles deemed them to the status of noisemakers. Something that makes a sound but lacked sophistication to play melodic or ensemble parts.

The major advance from noisemaker to instrument was due to the work of Giuseppe Donati (1836-1925), the inventor of what he named ocarina. His instrument created accurate pitch and an extended range. Other inventors based their ocarinas on Donati's design and the instrument spread to all corners of the world by the early 20th century.

By the late 1960s, a smaller English made pendant whistle capable of playing several notes of a scale came into use. Although these instruments could produce notes of varying degrees, they were incapable of consistency, therefore could not be used in school environments. At present, no music program to best of knowledge in the United States employs a globular whistle used as an educational tool.

The existence of a vessel flute to advance music pedagogy has been limited or non-existent. This is due to the materials they are made of and lack of accuracy concerning intonation and reliability. This lack of standardization is the main reason why globular whistles are not used for such educational functions. With reductions in the funding of music programs in the schools, the matter of a well developed economical teaching system becomes very important.

The potential to make such an instrument for a school environment is possible. What is needed is consistency in the instrument manufacturing process, along with a method designed specifically for the instrument, a notation system and creation of specific repertory. Consistency for instrument standardization is key but is held back due to the materials presently used, namely clay or wood. There is little to no chance clay can create consistent models. Wood is more accurate than clay, but requires a more labor intensive process for mass production which has not materialized so far. The workmanship alone would require a prohibitive price to schools.

Therefore, what is needed is a simple instrument plus related notation and methods that may be easily played.

SUMMARY OF THE INVENTION

The subject matter of this application may involve, in some cases, interrelated products, alternative solutions to a particular problem, and/or a plurality of different uses of a single system or article.

The present invention includes a closed-end woodwind that falls into the flute category. The outer body is nearly circular with a circular internal cavity. A windway at the rim of the body chamber allows the player to blow through a mouthpiece connected to the resonant inner cavity. As air travels through the windway and exits through an open area called the window, the air approaches a labium edge and is split to simultaneously leave the instrument up the labium ramp into the open air, while the remaining air enter the internal cavity.

Along the instrument's body are tone holes of different sizes. These tone holes are placed for desired intonation. The holes not only determine the instrument's pitch, but are positioned so index and middle fingers naturally fall upon them for optimal playing position, thus eliminating finger stretches. This closed-end flute is not capable of overblowing so range of the instrument is an octave and a minor 3rd which can be obtained through adjusting the angle of the instrument to lower pitch, thus produce 16 chromatic tones in a western scale. Along the body of the instrument is an eyelet which the ring finger/s can rest upon. This eyelet can attach to a keyring or neckware.

In one embodiment, the body may be made in two halves separated along the rim and pressed together at high temperature. After assembly, decorative finishes may be applied.

This invention may provide finer focused tonal clarity, timbre and resonance throughout the range of the instrument. Consistent air pressure is maintained throughout the instrument even as more holes are opened to produce higher tones. Use of a circular inner cavity within the interior of the instrument prevents rapid loss of compression from within. Air travels through the windway and backs up through the tone holes before it escapes into the open air.

The instrument is designed to fit hands of people ages 8 and above. The instrument shape may be tapered to address proper finger position and help the hand form a natural curve which eases finger tension. Voicing is designed to sound soft, yet focused so it can blend and be heard among other instruments.

In one embodiment, the inner cavity may be an altered circular shape to accommodate correct intonation in the ground tone (C'''). The instrument can play chromatically up to an octave and can be played beyond the lower octave by altering the upper lip above the windway exit (window).

In one aspect, a closed end woodwind instrument is provided. The instrument is formed of a body, which defines an internal cavity having a circular cross section. A mouthpiece on an outside of the body has a windway that connects to the internal cavity. The windway allows a user to blow air through the mouthpiece into the cavity and through the instrument. A labium is positioned along the windway, such that it splits air flowing through the windway so that a portion of the air flow enters the cavity and a remainder of the air flow exits a window. A plurality of tone holes are in communication with the internal cavity to allow air to exit the cavity. Upon blocking or opening these tone holes, different tones can be produced by the instrument.

In another aspect, a teaching method for operation of a closed end woodwind instrument is provided. The method may begin by obtaining the closed end woodwind instrument for a player. Next, a player is instructed on how to hold the instrument, blow into the instrument, and to play the five notes corresponding to open tone holes, and one finger covered holes, as well as trills and various other notes. Next, a notation system corresponding to the instrument is identified. This notation system, as discussed in detail below, uses visual identifications of what tone holes of the instrument to cover for a particular note. The player is further instructed to identify key signatures and other musical notations.

In yet another aspect, a musical notation system corresponding to a closed end woodwind instrument having four tone holes and a circular body is provided. This notation system utilizes a circular note having four areas corresponding to the four tone holes. A marking, such as a darkened area at any of the four areas indicates for a user to cover the marked tone hole with their finger. A length of the particular note indicated by at least one of a coloration and a stem direction.

BRIEF DESCRIPTION OF THE DRAWINGS

FIG. 8 provides yet another view of traditional music notation and a notation system of the present invention.

FIG. 9 provides a view of traditional music notation and a notation system of the present invention.

DETAILED DESCRIPTION

Figure 1:
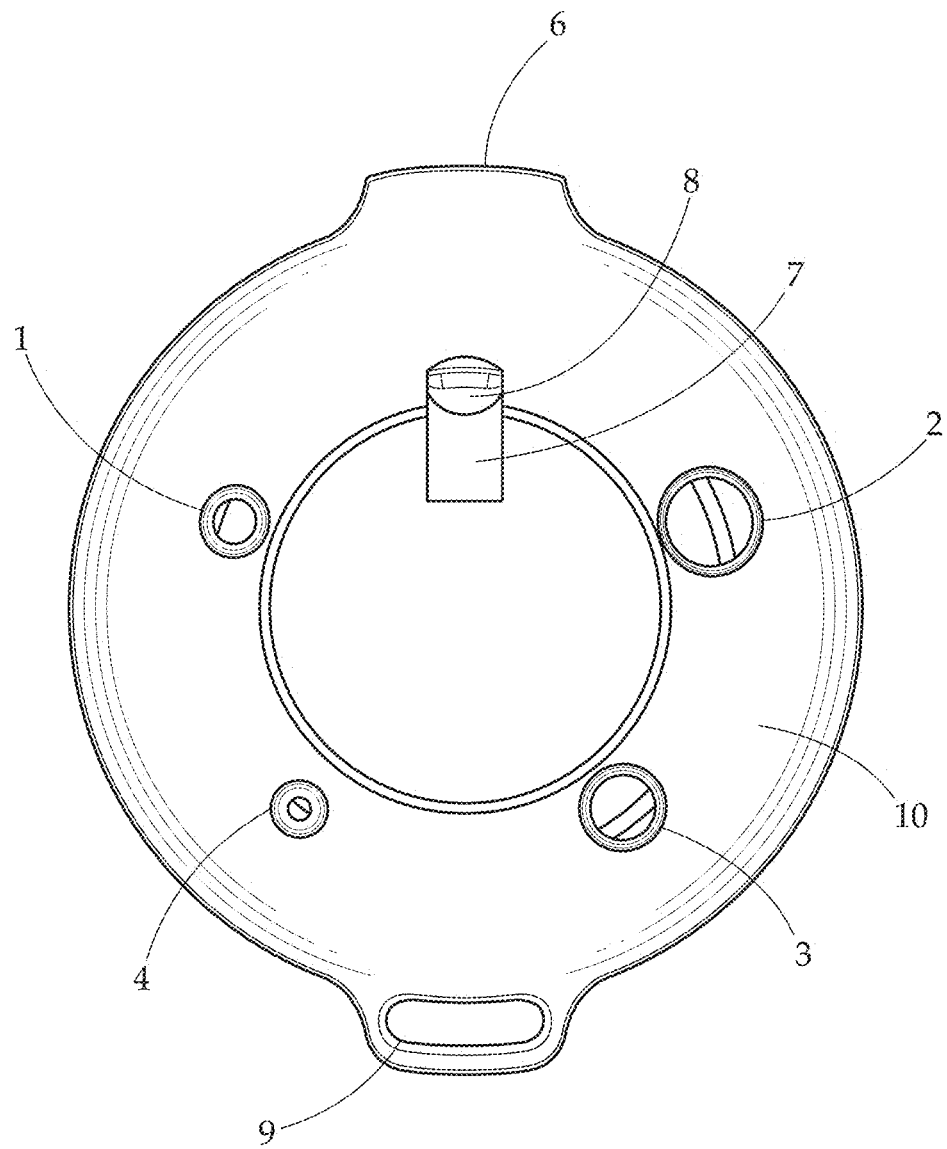
FIG. 1 provides an elevation view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

The present inventive instrument is a relative of closed-end whistles and other types of vessel flutes. The instrument is a closed-end instrument. It has a partial hollowed body with four tone holes connected to an elevated conical windway enclosed in the mouthpiece. The inner windway of the mouthpiece may be defined by two (upper and lower) body halves, or may be otherwise defined by the body. The entire instrument consists of the body and has a basic range of an octave. It is tuned in a specific temperament system, enabling the instrument to compromise 9 major/minor keys. This temperament differs from other tuning systems because it skips various keys located in the circle of fifths due to the instrument's limited range. An eyelet is located at the bottom of the instrument. The eyelet may provide a resting point for either ring finger and also provides an opening for a keychain or necklace attachment.

Although the instrument of the present invention, like other woodwind instruments, share some characteristics with the ocarina such as tone holes, mouthpiece and windway, it differs in range, pitch, voicing, construction and temperment.

The volume of the sound produced, can be imparted by way of vibrato or finger vibrato (flattment). If the instrument is blown too hard sound will cease since it is incapable of overblowing into higher frequencies (harmonic series), therefore such overblowing makes less volume than before. Also, saliva from the player's mouth can enter the air column coating the windway, therefore block the air from reaching the labium edge. Volume of sound is drastically reduced to below a level of audibility and can happen suddenly without prior warning.

The present invention is inventive for, among other reasons, the five following advantages:

Standardization of Pitch: It is impossible to standardize pitch on ceramic instruments due to the firing process. The instrument of this disclosure meets the strict pitch requirements according to the American Standards Association in 1936, whereas the A above middle C is be tuned to 440 Hz. This standard was taken up by the International Organization for Standardization in 1955 and reaffirmed in 1974 as ISO 16. Although not universally accepted, it is widely in use as concert pitch in the United Kingdom and the United States. It is also used as the tuning reference in just intonation regardless of the fundamental note of the key.

Temperament: Because of the limited range—one octave, equal temperament is the least effective tuning system to use because all the keys sound out of tune. Current globular flutes are tuned—if at all- to an equal tempered scale. A compromise must be made in the intervalic relationship between the globular flute's notes. A Pythagorean system would seem to be a likely candidate but the instrument of the present invention's range forbids a logical succession of 5th relationships to fall in line. For example, F minor would work, but the next 5th relation, C minor on this instrument, cannot be executed successfully. It has to skip over that to have G minor become tunable.

Over the centuries various tuning systems existed to aid instruments playing in certain modal ranges. Just or Mean tone was introduced to temper 3rds so they would not sound sharp. Because the instrument of the present disclosure can only play 9 of 30 keys currently in use, a new temperament is required to address the problem. The development of the tuning and temperament of the present invention employs a blend of Pythagorean, Just, and Mean-tone tunings to create reasonable compromises so all 9 keys are playable/tunable. Notes can be adjusted enabling this instrument to play with other non/equal tempered instruments and improved tuning when playing with other instruments of the present invention, bowed string instruments and fretless plucked instruments.

Ergonomics: Children have different hand sizes compared to adults. The present invention is designed not only to fit in the hands of a young player, but curvature in the overall design to establish proper hand position for future instruments such as clarinets and oboes. The curvature of the instrument aligns with the natural curvature of the hands. Fingers in a natural state fall on instruments at an angle, not straight up and down.

Voicing: Recorders were never designed for a school environment. They were designed to play in ensemble, in consort arrangement or by themselves. Some instruments were introduced into the school system without any historical president, therefore a multiple of high pitched instruments created a difficult environment for teachers and parents to deal with. The present invention solves this problem by adjusting the voicing of the instrument so it can be played in multiples producing a compatible sound. Hence it is quieter than other flutes (recorders).

Material: In order to obtain consistency of pitch, intervalic relationships, keynote and sound quality, plastic ensures instruments can be made identical from one to another. This solves the problems of tuning and intonation. The present inventive instrument is designed to play at one breath pressure, unlike the recorder which requires several different levels of breath pressure. The other advantage of a plastic is it will not warp or shrink (like wood) or break if dropped (like ceramic).

Turning now to FIG. 1, an elevation view of an embodiment of the present invention is provided. In this view, the body 10 can be seen to define four tone holes 1, 2, 3, 4, each of a different size. It can also be seen that the four tone holes 1, 2, 3, 4, have centers that are at unequal positions relative to a center of the body and are differently sized. A mouthpiece 6 is at one side of the body 10. Opposite to this mouthpiece is an eyelet 9 which acts as a spot to clip the instrument to a holder, lanyard, or the like, and/or provides a holding point for the instrument. The mouthpiece 6 has a windway (shown in other figures) which allows air to pass through the windway and into an internal chamber of the body 10 (shown in other figures). A labium ramp 7 is positioned to split an air flow passing through the windway at its leading edge. A window 8 allows a portion of air passing through the windway to exit, as split by the labium ramp. A remainder of the air passing through the windway enters the internal chamber and then is released through tone holes 1, 2, 3, 4. In this embodiment, and the embodiments shown in the remainder of the figures, the instrument of the present invention contains exactly four tone holes. However, the present invention is not necessarily limited to only four tone holes.

In one embodiment, alteration of pitch is controlled by opening and closing of the tone holes of varying diameters in which all holes covered produces the keynote of the octave scale (c''') and all fingers opened produces the highest possible tone (c''''). The index fingers of the right and left hand cover the top holes and the middle fingers cover the bottom holes. The ring finger(s) may be placed on the eyelet for greater stability. Alteration for the lowest possible tones (to a'') called flattening can be achieved by pressing the lips towards the window.

Figure 2:
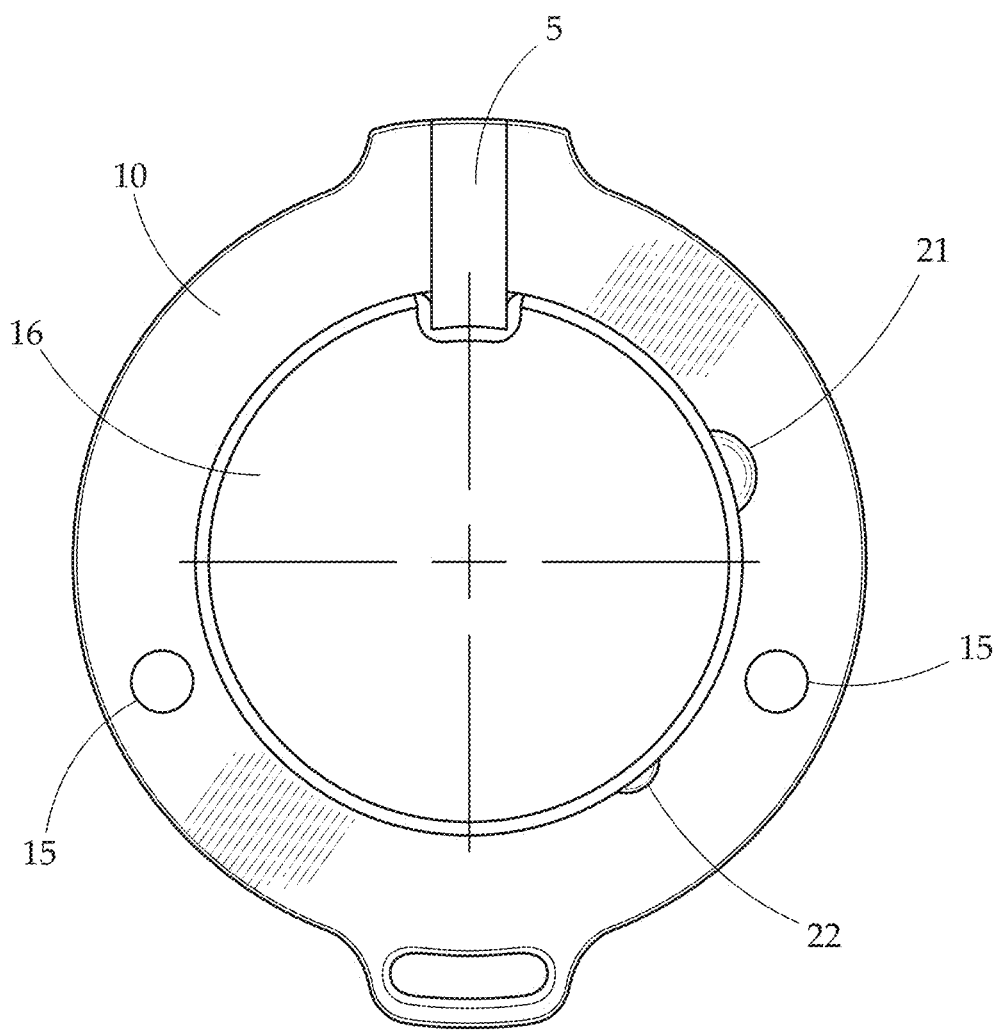
FIG. 2 provides a partial cutaway view of an embodiment of the present invention.

FIG. 2 provides a cut away view of an embodiment of the present invention showing internal components. The body 10 defines an internal chamber 16, shown in this view as a circular chamber. In the embodiment shown, the side walls of the chamber are approximately perpendicular to a floor of the chamber, however in other embodiments, curved sidewalls may be used without straying from the scope of this invention. A windway 5 extends from the mouthpiece at an inlet to the chamber 16 at an outlet, allowing blown air to pass into the chamber 16. Cutouts 21 and 22 allow air to flow evenly to the tone holes 2 and 3, which are positioned above the cutouts 21, 22. Energizer 15 is formed as a post to be received by an energizer recession 11 in this embodiment, which allows for a two piece construction.

Figure 3:
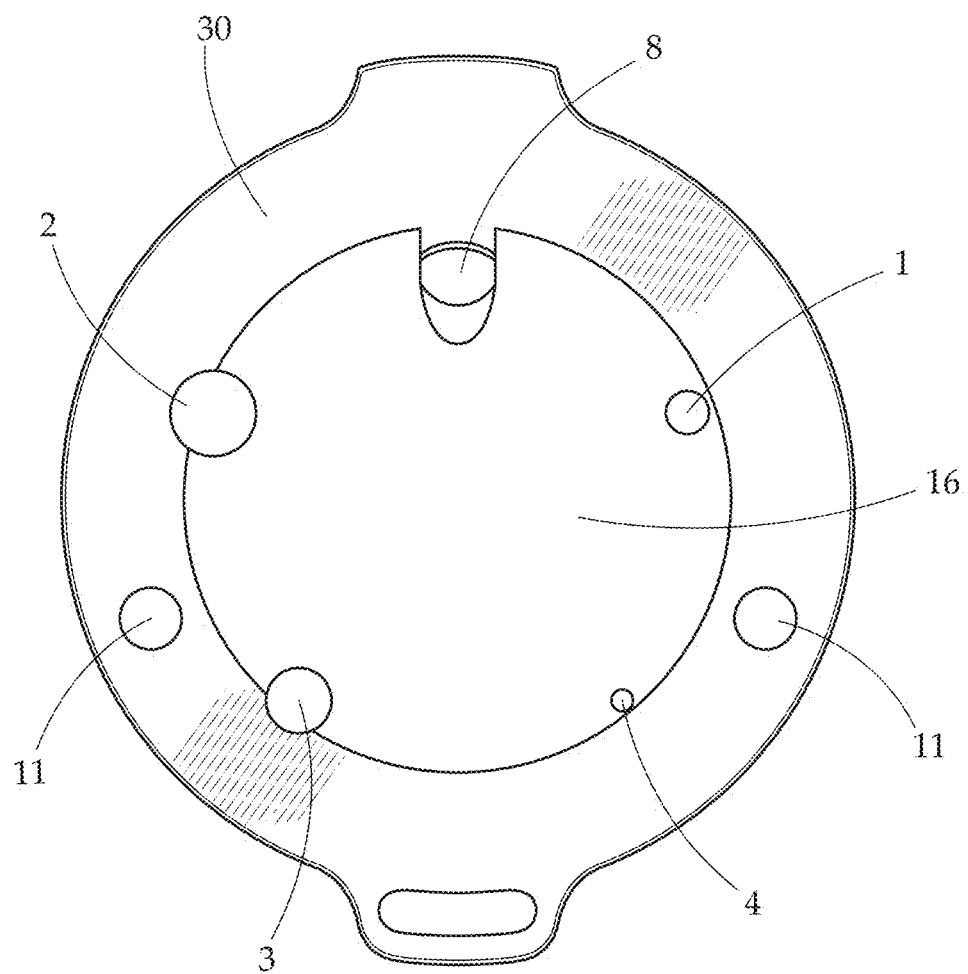
FIG. 3 provides a bottom view of a top portion of an embodiment of the present invention.

FIG. 3 provides a view of a top portion of the body in either a cut away view, or when formed as a two piece body. The window 8 can be seen defined by the body top portion 30, as well as having a partial windway passing over it. The inside openings of the tone holes 1, 2, 3, 4 connect with the interior chamber 16 to allow air to escape through them. Energizer 11 is formed as a recession to receive a corresponding energizer post 15 from the bottom portion, thereby allowing the two parts to connect.

Figure 4:
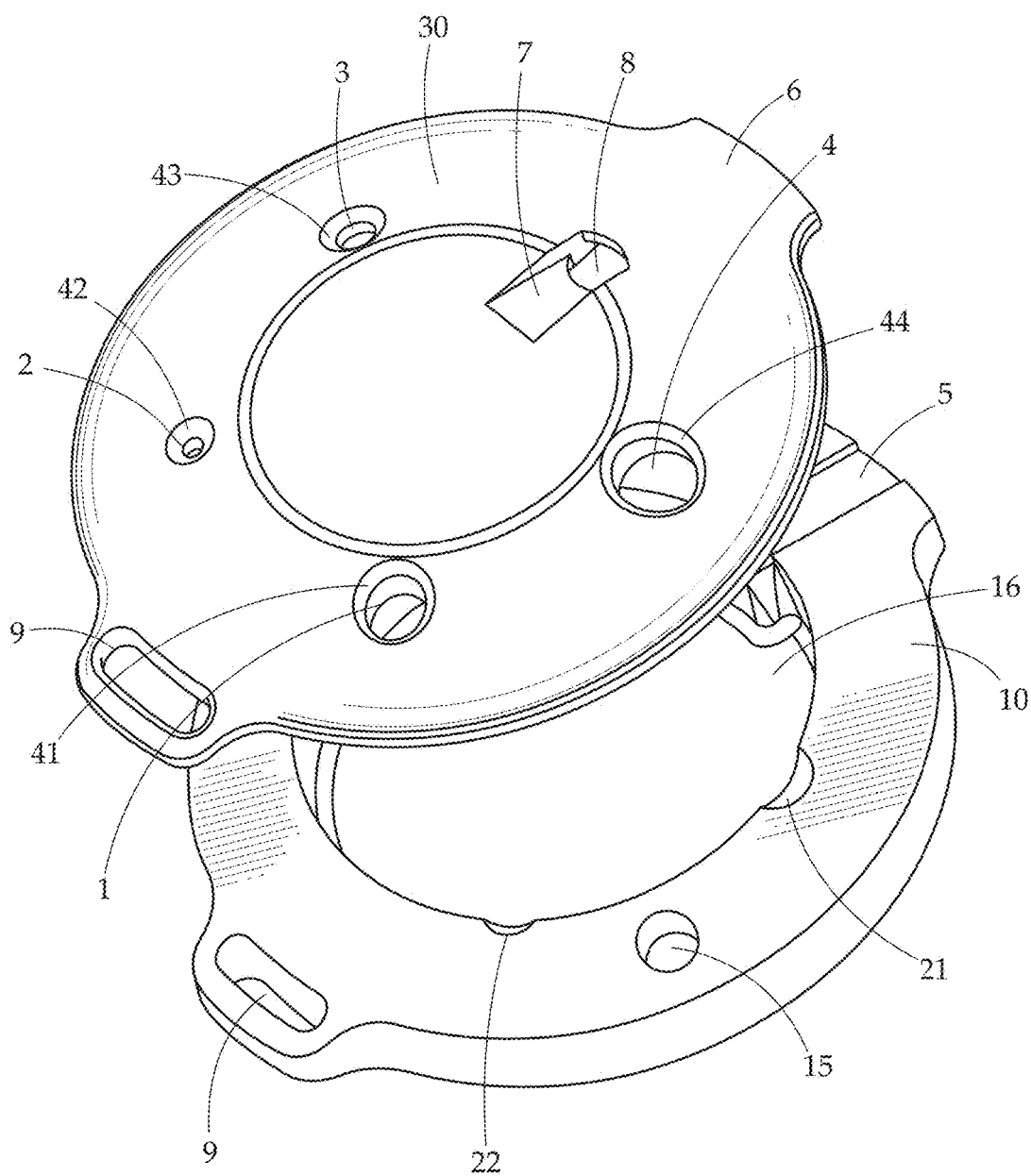
FIG. 4 provides a perspective view of an embodiment of the present invention.

FIG. 4 provides a partially exploded perspective view of an embodiment of the present invention. Mouthpiece 6 is integrally formed with body 10 and top portion 30. The mouthpiece defines a windway 5, which allows air to pass through, being split by the labium 7. The air passing through the windway is split such that part of the flow exits the window 8 and the remainder enters the internal cavity 16. Tone holes 1, 2, 3, 4, are positioned over the internal cavity 16 to allow air to escape when they are not blocked by a finger of a user. Cutouts 21, 22 facilitate this air communication. In the perspective view, the tapered areas 41, 42, 43, 44 can be seen about each tone hole 1, 2, 3, 4. These tapered areas may allow a pad of a user's finger to more effectively cover and seal around each tone hole 1, 2, 3, 4, and further may adjust tone when uncovered.

Sizing, shaping, and proportions of the present invention may vary depending on embodiment. However, in one embodiment, the instrument of the present invention may be sized as follows. The cavity may have a circular diameter of approximately 38.14 mm (+/−0.1 mm) and a depth of approximately 7.57 mm (+/−0.1 mm). The mouthpiece may be approximately 5.24 mm wide (+/−0.1 mm) with a windway having a length of approximately 15.69 mm (+/−0.1 mm). The entry of the windway is approximately 5.56 mm (+/−0.1 mm) from a bottom of the instrument, and elevates up the ramp ending at approximately 7.14 mm (+/−0.1 mm) from the bottom of the instrument. The first tonehole, at the northwest quadrant of the instrument may have an inner hole sizing of approximately 3.00 mm (+/−0.1 mm). This hole tapers outward to have an opening on an outside of the instrument of approximately 5.12 mm (+/−0.1 mm). The second tonehole, at the northeast quadrant of the instrument with the mouthpiece facing upward may have an inner hole sizing of approximately 6 mm (+/−0.1 mm). This hole tapers outward to have an opening on an outside of the instrument of approximately 6.44 mm (+/−0.1 mm). The third tonehole, at the southeast quadrant of the instrument may have an inner hole sizing of approximately 5.50 mm (+/−0.1 mm). This hole tapers outward to have an opening on an outside of the instrument of approximately 5.62 mm (+/−0.1 mm). The fourth tonehole, at the southwest quadrant of the instrument may have an inner hole sizing of approximately 1.50 mm (+/−0.1 mm). This hole tapers outward to have an opening on an outside of the instrument of approximately 4.46 mm (+/−0.1 mm).

The spacing and distance of these four toneholes is not necessarily an equal distance from a center of the instrument. For example, in one embodiment, a center of the first tonehole may be positioned approximately 16.31 mm (+/−1 mm) to the left of a center point, and 6.42 mm (+/−1 mm) up from the center point. A center of the second tonehole may be positioned approximately 17.60 mm (+/−1 mm) to the right of a center point of the instrument, and 5.39 mm (+/−1 mm) up from the center point. A center of the third tonehole may be positioned approximately 13.54 mm (+/−1 mm) to the right of a center point, and 15.65 mm (+/−1 mm) down from the center point. A center of the fourth tonehole may be positioned approximately 12.75 mm (+/−1 mm) to the left of a center point, and 13.65 mm (+/−1 mm) down from the center point. Temperament of the tone holes can be altered by enlarging of the tone holes or the insertion of beeswax to shrink the hole.

The instrument of the present invention can be used in any variety of ways, and its use may be taught in any manner sufficient to allow playing of the instrument. In one embodiment, a specialized inventive method of teaching may be utilized to streamline teaching.

The teaching method of the present invention seeks to provide a satisfactory gateway to the first stages of instrument instruction. It introduces restrictive knowledge to the pupil crating a faster rate of learning. Students, when compared to the recorder counterparts, can obtain the same amount of playing accomplishment in 1/8 the time as they can successfully read, perform, and compose repertory at a faster rate using the present inventive instrument and teaching method in combination.

The teaching method of the present invention employs sightreading, basics of music, a new notation system, composition, and music repertory intended for use by students and educators. The method spends less effort to "play by rote" learning or "playing by memory." The method of this disclosure creates an easy entry-level instruction for any student with a minimum of 6 fingers from both hands.

The goal of the teaching method is for the player to perform independently and successfully and work well with other musicians. Unlike the Suzuki and Orff Methods, the this teaching method is designed to be an economical alternative. The instrument and publications are designed to be inexpensive. The instrument's size and economics are designed to fit the concept, "small is beautiful;" Small instrument, small pieces etc. the instrument of the present invention is a miniature system. Although greater scope of repertory can be reached, the method is designed to keep music reading limited to one page. This is to encourage students to move from one piece to the next which greatly improves their sight-reading skills. The teaching method is designed so students can get through the books quickly creating a sense of accomplishment plus interest. The teaching method contemplated herein is the gateway instruction to other instruments, as well as singing.

The teaching method of the present invention is the only method tied to a single instrument. Suzuki is primarily associated with string instruments, Orff is largely based on percussion, recorder and singing, Dalcroze applies to all instruments although it offers no specific instrument instruction and Kodaly is associated with no instruments whatsoever. Only the method of this invention employs one instrument. The method itself is not transferable to other instruments and only exclusive to the inventive instrument disclosed herein.

Although the inventive instrument of the present invention can be used beyond this method, it's main purpose is preparing students to transfer their basic music skills seamlessly onto more complex instruments. The recorder is assumed to be suited for this objective but has yet to meet expectations in the United States. Most students who obtain recorder instruction do not learn enough theoretical or instrumental skills to successfully transfer onto other instruments. This is due to the recorder's level of difficulty for beginners which currently has no unified school of instruction. A majority of young students who learn that instrument cannot play any type of simple scale after two years of instruction, whereas this teaching method can teach most children the scale in approximately 3-5 minutes.

The teaching method addresses proper disciplines which improve the ability to hear, play properly in tempo, correct finger dexterity, master phrasing, articulation and playing independently in ensembles.

The teaching method also differs from the above mentioned systems because approach focuses on individual rather than group playing. The higher an instrument's pitch, the greater difficulty to play more than one instrument in tune. This applies to instruments which have a ground tone an octave above middle C. Therefore, playing a high instrument in tune with one another is extremely challenging, even for a professional. Most methods employ group playing as a time saver and cost cutter. The teaching method sees this as antithetical to successful instruction. The teaching method and its related repertory are specifically designed for one-on-a-part playing. Doubling parts or mass unison playing is not promoted.

Although recordings can be used to demonstrate music, the teaching method relies more on a teacher to demonstrate pieces and exercises. Less emphasis on learning by rote or listening to audio sources, both are shortcut towards memorization and inflexibility. Learning by rote is not the strategy of the present invention, as it is in programs like Suzuki for example.

Because the method stresses the individual in the group, students are encouraged to support each other's efforts, producing an attitude of generosity and cooperation which are the foundations of group ensemble discipline.

The teaching method's greatest difference lies in the instrument itself and its deliberate limitations. In other words, the present inventive method is tied specifically to the instrument of the present invention. Advantages of this instrument allows for unique aspects of the teaching methods. For example, the instrument disclosed herein: is the lightest instrument to hold; the easiest to blow; operates with one level of breath pressure; allows for the longest breath lengths of all woodwind instruments; and eliminates finger stretch and cross fingerings, among others.

Most instruments in use today are the result of centuries of design improvement. The demands for greater volume and range, combined with additional demands for instruments playing in multiple keys signatures requires complex systems difficult to master in the beginner stage. The elimination of these multiple player issues can liberate a student, focusing on issues more important in the beginner stage. The range limitation of the instrument of the present invention (one octave) makes it easier to learn all necessary notes and symbols during the early stages, whereas other instruments have anywhere from 30 to 88 notes to master. With only four tone holes, the instrument of the present invention requires only four fingers to cover holes and no keys to use.

Most woodwind instruments require different ranges of breath intensity. A recorder when properly played requires different breath pressures in the lower, middle, upper and high ranges due to harmonic breaks. Most contemporary woodwinds are open ended, therefore work on different overtone groups to connect the ranges. The present invention is a closed-end instrument and cannot overblow, therefore, only requiring one range of breath pressure.

The teaching method may use two method books, an exercises set, and a unique body of repertory. All of the above publications uses two notations simultaneously, Western Notation and the notation of the present invention (which is discussed in detail below). Beginners work with the tablature while comparing it with western notation providing familiarity. When the two method books are completed, western notation and the additional music symbols associated with it are familiar to the student. The shift to other instruments using the western system is an easier transfer.

The teaching method of this invention can focus on other music issues other methods avoid in the early stages, sight-reading and composition. The teaching method strongly believes these disciplines should be employed in the earliest stage of musical development. Sight reading is introduced in the first lesson. The notation system of the present invention is designed to facilitate this skill. Other methods employ learning-by-rote. The teaching method believes all forms of music instruction involve memorization. Where most methods rely heavily on this action, this focuses less on memorization and more on sight-reading.

The case for sight reading: Memorization, compared to sight reading can pose problems if over relied upon. When memorization is the soul source of learning music, it discourages discipline to read. Memorization requires more time to learn a piece, on average 4× longer for a 16 bar work. The longer the piece, the greater the multiple. Finally memorization locks the student's mind preventing flexibility. A sight reading student can locate a mistake and correct it instantly whereas a student who memorizes a piece must go through the process of "unmemorizing," a time consuming process.

Composition completes the inventive teaching method. The teaching method believes in hand writing skills combined with learning early compositional forms. When learning any language, multiple disciplines are learned. In English, the ability to speak, the ability to read and the ability to write. In music, playing, reading and writing are intertwined into the teaching system.

Because the teaching method is an easier method to learn, students can teach other students who may have learning challenges. The teaching method is aimed at ages eight years and up.

In one embodiment, the teaching method may be taught in two stages, a first stage and a second stage. The first stage may comprise the following steps: Learning the 8-note scale and reading it back by way of a notation system described further herein specifically designed for use with the present inventive instrument; Introduction to music basics: 5-line staff, G clef, bar lines, bars, time signatures 3/4, 4/4; Half, quarter, eighth note/rest; Western notation; Bar numbers, repeat signs, beams, flags, pickup notes; Accidentals; five exercises; 13 pieces; Further teaching of the notation system;

The second stage may be taught after the first stage, or may stand alone as a teaching method without the first stage. This teaching stage may comprise the following steps: Quick Start: Learning the 8-note scale and reading it back by way of the inventive notation system; Double bars, refrain, bridge, da capo al fine, slurs, legato, 1st/2nd endings, ties, accidentals; Whole, half, quarter, eighth, sixteenth notes+ dotted, triplets, tremolos, trills; Time signatures 4/4, 3/4, 6/8; Canon form; Major/minor keys; 11 exercises; 15 pieces; Composition; Further teaching of the notation system as well as a shorthand modification of the notation system.

At the beginning, the first instructions are shown and a teacher instructs the player how to hold the instrument in the hand, it's proper playing position, where the thumbs, index, middle fingers are placed, the windway and where the lips meet it, first tips on blowing using proper lip placement, first use of articulation, then the learning of five notes and their finger positions by using the notation system discussed below. Once that is mastered the player reads from tablature illustrating the notes in western notation.

Key signatures are introduced in the second method book which shows the possible keys (including major and minor) that the instrument of the present invention can play. The student chooses a key (for example F minor), copies the first two bars and must write additional four bars to complete the piece and must be notated in both the inventive notation and western/standard notation.

For teachers, it is important to create the proper atmosphere when presenting instruments to a class. The teacher is instructed to teach with their side of the body facing the class while holding the instrument so the students can see the proper hand position, selected fingering, and the proper position of the instrument. Demonstration of the fingers used to cover the holes is discussed including the use of the thumbs. The teacher is instructed to deal with each child individually and not have the entire group always playing simultaneously. The teacher checks each student to be sure hand positions are correct. Basic articulation is discussed and illustrated, showing the differences between articulation that works best for the instrument and less than desired forms.

Teachers should show examples of good and poor hand positions when playing. This is followed by a discussion on using other instruments outside of the instrument of the present invention. Most if not all of such instruments are in other keys, therefore can only use this system if they can transpose western notation at sight, or rely solely on the notation system. Discussion of where the tablature is in relation to an example of music is also discussed. A warning is issued if using other instruments in the system will force teachers to discuss prematurely the difficult issues of key signatures.

The next step of the teaching discusses composition. Teachers are encouraged to be enthusiastic about all efforts made at composing. The goal is to make composition commonplace in a student's life. The goal is that students can play well, read well, write well and therefore compose well. Each student is required to play their own compositions. Use of keyboard is recommended.

The final page deals with the issue of key signatures. This is a delayed discussion for the teachers only. Since the notation system of the present invention contemplated herein requires no use of key signatures, staff or accidentals, this explanation is for teacher's eyes only. The instrument is limited and cannot play in all keys successfully as most modern western instrument are designed to. The instrument of the present invention can only play in nine keys verses 30 keys other known instruments can play from. An explanation as to the best keys are presented as well as keys that are more challenging/limited. A discussion on hypo modes and limited scales is also presented.

The present invention further contemplates a notation system specifically designed to be used with the inventive instrument disclosed herein. The notation system may include two aspects. A tablature notation, and a shorthand version. In particular, this notation system is a music notation system and method for the instrument discussed herein. It is designed to eliminate several symbols used in music by way of compressing combined symbols into shapes that resemble notes and rests of the western notation system. The full version of the notation system can be further compressed into a shorthand version for quick writing. The notation system contemplated herein is primarily intended for the instrument of the present invention and is not designed for other closed-end flutes or any other wind instruments.

The present notation system provides several improvements to such described tablature systems and is the only stand-alone system for a woodwind available. It is unique among woodwind notations in which it employs not only pitch, but rhythmic information in one symbol by way of using a circle, dots, stems and flags.

The notation system of the present invention eliminates the use of a staff, ledger lines, clefs, sharps, flats and natural accidentals since the four inner circles, whether open or darkened, already indicate which pitch is to be played. It does not ascend or descend to indicate high or low pitch. It is written and read in a straight horizontal line. It is not necessary to indicate rhythm by way of spacing, however it can be written to interpret phrasing. The system resembles and works along standard notation, making communication with other musicians who only use the generic western notation easier. The notation system allows complete communication with other musicians so that ensemble playing is made easier. The use of this notation system prepares one for using the western notation system as the student moves on to an instrument that utilizes such notation.

The notation system of the present invention features four circles enclosed in a larger circle. The inner circles are either open (white) or shaded (black). The larger circle is either clear or shaded. The shape of the large circle resembles a note head except it is symmetrical instead of the western oblong note head shape. Elements of western notation can be attached to the tablature making it resemble various durations from whole notes, half notes (stems) quarters, eighth (beams or flags), as well as dots, slurs and ties. A western quarter note consists of a black shaded note head connected to a stem. A quarter note of the present invention consist of a purple shaded note head connected to a stem.

The present invention mimics western notation with one major addition. Note heads are enlarged holding fingering information. To further augment capability, a list of music symbols and lines can be incorporated for greater clarity and precision. The note head is shaded in, for example, lavender. Notes indicated as half or whole use no color therefore resembling their equivalents in western notation.

The purpose of the present invention is to provide a notation system which is not only easier to read than western notation, but has a resemblance towards it so when both notations are used in the teaching method, the similarities of symbols in both notations are recognized. Therefore when a student learns the notation of the present invention, they are also learning western notation as well. This is clear when the students leaves the instrument and transfers to another instrument that does not use the inventive notation system, but uses the similar looking western notation.

The standard range is eleven notes comprising the octave of c'''-c''''. There are exceptions for extended lower notes but the highest note in tablature is c" " since the instrument of the present invention cannot be overblown into a second harmonic.

A small black crescent is located at the bottom of the instrument to establish the proper position of the instrument. The black crescent is the area where the lips are placed upon the instrument in order for the player's breath to enter the instrument. Finger locations are as follows: NW-left middle finger; NE-right middle finger; SW—left index finger; SE-right index finger. The notation system does not provide information for left or right handed players since the fingering positions are relatively equal.

Dark or open circles determine the fingering of the pitches. An open circle indicates fingers off the hole and a darkened circle indicates a finger placed upon the hole. Diagonal lines indicated the use of a tremolo. Ring finger position is not illustrated in the tablature, because it is up to the discretion of the player. It is not mandatory to place ring fingers on or off the instrument. Thumbs are placed below the instrument and need not be illustrated as well.

When writing a piece of the notation requires the use of the tablature symbols plus a time signature, rhythm for rests and barlines. Beams can be used as replacement for flags increasing legibility.

The notation system of the present invention is designed to eliminate the following symbols in music: Accidentals: sharps, double sharps, flats, double flats, natural; Clefs; Key signatures; Slanted beams; Braces and brackets; Staffs; Ledger lines; Volume dynamics.

When writing, a person can bypass the use of colored notes heads by simply drawing a stem down the left side of the half note. Otherwise all smaller values (quarters, eights) have the note head stem up and to the right.

The notation is read from left to right. Western notes move up and down a staff to indicate pitch. Since the system provides that information by the shading or opening of the four inner circles all notes are written in a straight line therefore need not ascend or descend. Rhythm is indicated by the use or non-use of stems, flags, dots, beams, and ties. Due to the characteristic of the present instrument, there is no need for volume dynamics.

A minimum of four elements are necessary to use the notation system: Time signature; Rhythm (notes/rests); Pitch; and Bar lines.

All pieces start with a time signature. First note can also be indicated as pickup note/s or note on the downbeat. The management of rhythm is by way of bar lines. Repeat signs and double bars can also be utilized. Phrasing of a music section can be illustrated by skipping to the next line rather than bunching one phrase after another on a single line. Location is checked by use of bar numbers. Rest are essential in order to manage rhythm. Ties stretch rhythm over bar lines. Pieces usually end with a double bar.

Beams for eight, sixteenth, thirty second notes are used only on numbered beats. Notes that fall between the numbered beats (subdivisions), must use flags on the righthand side of the note. One can beam a string of eight/sixteenth notes in a bar, so in 4/4 one can beam up to 8 eighth notes or 16 sixteenth notes.

When combined with western notation, the present notation system is written above the staff. Notes appear larger than standard notation making it easier to read and understand. The notation system also uses symbols (articulations, breath marks for example) above the notes. Ties and chord symbols are written below. Chord symbols enable an accompanist to use the system.

The notation system is designed to accommodate the following symbols in music: Tempo; cues; arpeggios; articulations; simile; augmentations (dotted notes); bar lines; beams: single, double, triple, and fractional; time signatures; lyrics; breath marks; caesuras; chord symbols; endings; ornaments; repeat signs; rests, including multiple; ties; Slurs; tremolos; trills; triplets & tuplets.

All notes in the present invention employ at least four circles contained in a circle. They are either shaded in purple or not shaded at all. All tabs may use a small crescent located on the bottom to establish the correct hand and lip position of the instrument, therefore, it is the same view as if the player was looking down at the instrument while playing and not a mirror image. The first example is a dotted quarter note in g'''. It resembles a western dotted quarter in appearance using a shaded notehead, a stem and a dot on the right hand side of the note. The next example is also a dotted quarter note g''' but uses a diagonal slash on the NW hole meaning, the player moves the left middle finger several times up and down to create a tremolo. The next example show non-shaded notes of which the one on the left is a g''' half and on the right, a g''' whole note.

Shaded notes are used in publishing. When music is hand written a problem occurs with how to handle the quarter note and how to distinguish it from a half note which both employ stems. Since handwriting every shaded note is tedious and time consuming, a solution is met by adjusting the stem of the half note downward and to the left of the note head.

To create a piece of music or an exercise consisting of more than one bar of music, the notation system requires in the following order, a time signature to establish the meter, barlines to manage the rhythm and the tabs plus rests to complete the picture.

Beams can be substituted for eight note flags making the music easier to read, however they must follow the rule. Beams must start on a principle beat and not a subdivision, otherwise they present difficulties in reading when they are off the beat, therefore flags must be used. Beams however can be used for the entire length of a bar to ease reading but all the rhythms must be the same.

Figure 5:
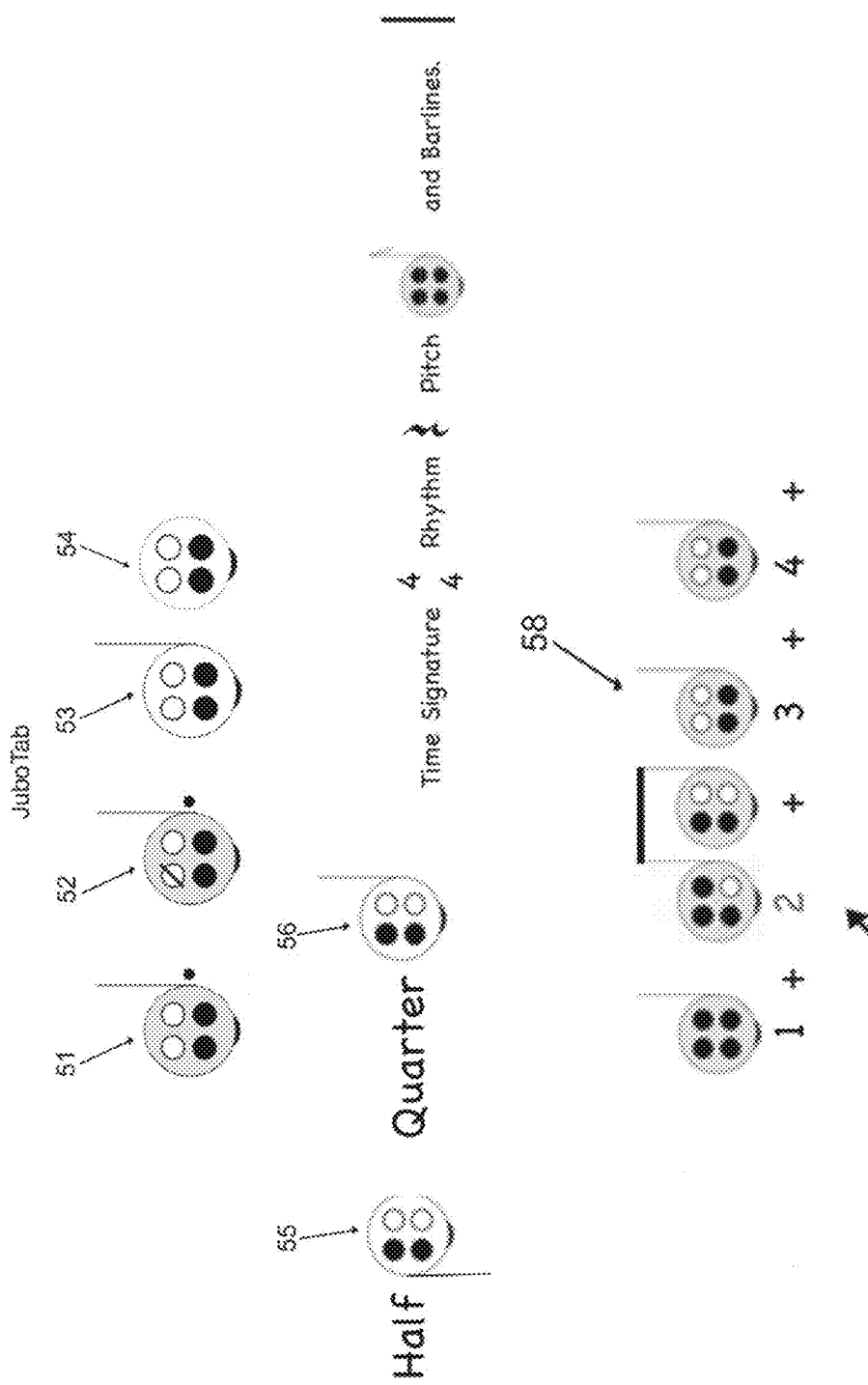
FIG. 5 provides a view of an embodiment of a notation system of the present invention.
Figure 6:
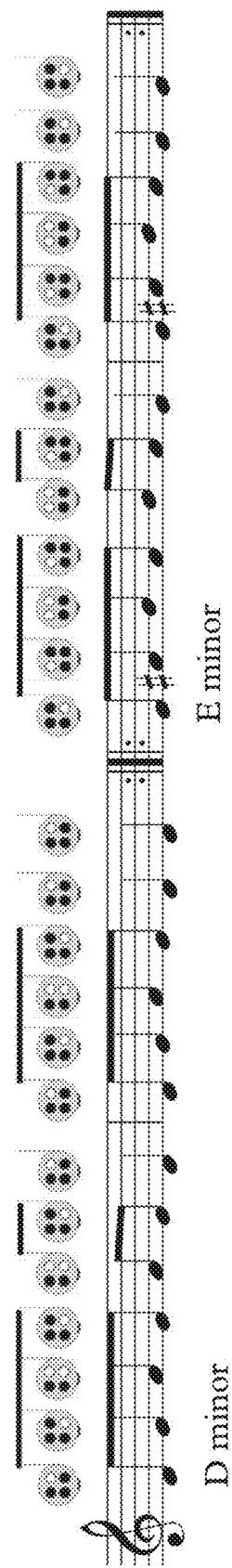
FIG. 6 provides a view of traditional music notation and a notation system of the present invention.
Figure 7:
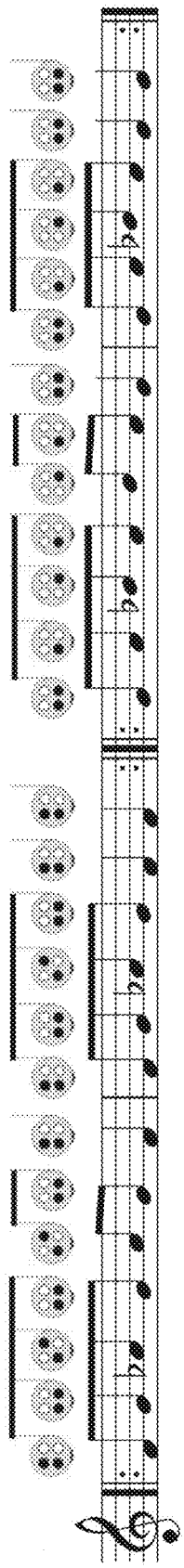
FIG. 7 provides another view of traditional music notation and a notation system of the present invention.

FIG. 5 provides a view of an embodiment of notation of the present invention that is tied to the inventive instrument of the present invention. All of the notes of the marking system have at least four circles contained in a circle note. These notes may be shaded or not shaded. For the particular note, certain of the internal circles are blacked out indicating to a user to cover the matching tone holes of the inventive instrument. The circle notes 51-54 for example, each have a small crescent located on the bottom to establish the orientation of the instrument. Note 51 shows a dotted quarter note in g". Note 52 shows a dotted quarter note in g", and includes a diagonal slash on the northwest hole, indicating that the note should be played as a tremolo over the slashed tone hole. Note 53 shows a half note in g", and note 54 shows a whole note in g". In some embodiments, shaded notes may be used to show a quarter note. However, in other embodiments, a downward stem may be used to show a half note, as shown in note 55. In this embodiment, a quarter note may be identified by an upward note stem as shown in note 56. Notations 57 and 58 show examples of indicating how the notes fall on a particular beat. These may be indicated initially at a beginning bar as long as the rhythms remain the same. Other musical features such as time signature, pickup notes, repeat signs, chord symbols, slurs, staccato and accent indicators, endings, breath marks, changes in time signatures, tenuto, tie, fermata, dal segno al fine, dal segno, fine, and the like, may all be used in the inventive tablature notation in the same or similar manner as in traditional notation. In some embodiments, these markings may be above or below the inventive note markings, which may vary from traditional notation. In a particular embodiment, chord signatures may be positioned below the notes.

Figure 10:
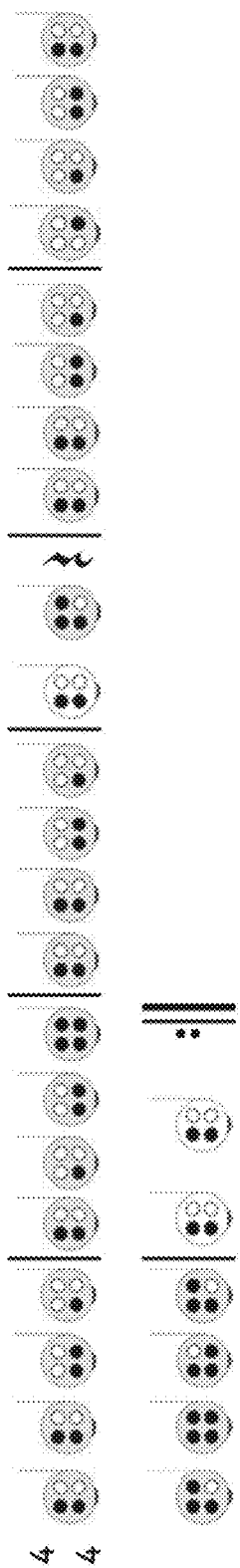
FIG. 10 provides a view of an embodiment of the notation system of the present invention.

FIGS. 6-9 show various scales presented in the notation system of the present invention, having their traditional notation below for comparison. FIG. 10 shows the inventive notation for the song Yankee Doodle. As is shown, the song is written in 4/4. The first three bars show four quarter notes per bar in their appropriate notes corresponding do the appropriate tone holes to cover on the inventive instrument. The fourth measure shows a half note followed by a quarter note and a quarter rest. At the end of the piece is a right repeat sign indicating the piece may start over again. A bar number (7) is written to indicate where the performer is in the music. In a particular embodiment, a computer or computerized device may be configured to automatically transpose traditionally notated music into the notation system of the present invention. The computer or computerized device may then display or otherwise present the transposed inventive notation to be used by a player of the inventive instrument.

The shorthand notation of the present invention is a stripped-down version of the full notation system discussed above. Where the full notation system is most appropriate for the publishing of music, it is time consuming to write out by hand mostly due to the shading of notes. A simpler and quicker way to present the same information can be achieved by its shorthand version. It uses less symbols, therefore faster to write out.

The concept of four inner circles enclosed in a larger circle is still valid, the shorthand notation eliminates inner open circles using only inner darkened circles indicating which holes are to be covered. The highest note (c"") is illustrated with no circles at all. Darkened circles are either northeast, northwest, southwest, southeast. This can be written quicker than the full notation system by minimizing repeated note values. It involves only: The large outer circle; Up to four inner circles; Stems up and down (downward only for half note); Bar lines; and time signature.

Shorthand notation abides by the principles set up by the notation system which means a time signature, barlines, rhythm in notes and rests must be used, otherwise it becomes illegible and unmanageable. Since shading is too time consuming, every shorthand large circle is clear. The other major difference between the two systems is only covered inner circles shown in black, therefore depicting open circled holes is unnecessary. The final major difference is if a similar rhythm is repeated it is not necessary to write out that similar rhythm reducing redundancy.

Figure 11:
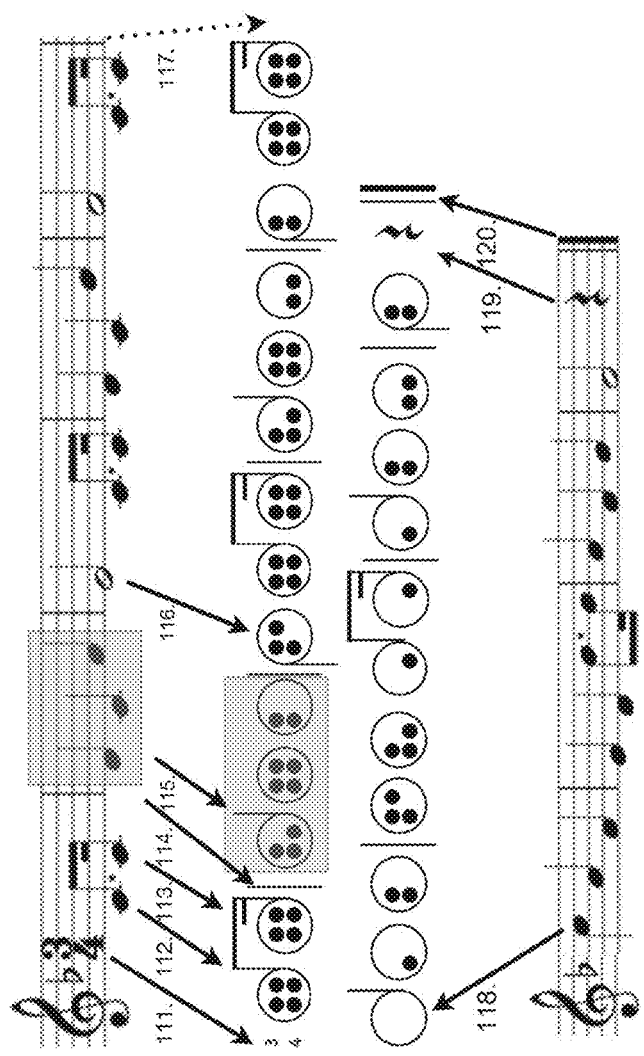
FIG. 11 provides a view of an embodiment of a transposition of the notation system of the present invention.

FIG. 11 shows an embodiment of a shorthand notation version of the present invention. This shorthand is a stripped-down version of the inventive notation demonstrated in FIGS. 5-10. In this embodiment, the large circular note having smaller internal circles indicating what tone holes to cover is still used. A difference from the above discussed notation is that the open inner circles are not shown, only the darkened circles corresponding to covered tone holes. The highest note (c" " for example) is illustrated with no circles. Darkened circles may be in the northeast, northwest, southwest, and southeast quadrants. As such, it can be seen that the shorthand notation includes only: the large outer circle of the note; up to four inner circles; stems up and down (downward only for half note), bar lines, and time signature. Further, in the shorthand notation versions, if a similar rhythm is repeated, it is not necessary to write out that similar rhythm again, thereby reducing redundancy. Further, this shorthand notation, like the notation discussed above, does not require the use of music stationary.

With a maximum of four darkened circles used, it is easy to place and determine their location. All pieces begin with a time signature. A pickup can be indicated by a bar line written to the right of the tab. Bar lines manage the rhythmic distribution. So for example if the pickup note is shown as a quarter note, the first bar can have three quarter notes without having to show a quarter stem. It will be assumed that three equal notes in a 3/4 bar are three quarters. This can be changed by indicating a new rhythm. Suppose the next bar introduces a half note, then the remaining third of the beat could be one symbol a quarter note or rest, or two symbols like two eights for example. As in above discussed notation when the notes fill out a line, it is not necessary to add a barline at the end.

Repeated notes follow a simple rule. If eight quarter notes are written, only the first need use a stem and the other seven can be stemless. What keeps the accuracy are the barlines which manage the rhythm. A rhythmic change is made by simple substitution of a new rhythm.

Turning again to FIG. 11, a transposition of traditional notation to the shorthand notation of the present invention is shown. Here, the time signature 111 is shown in approximately the same place as traditional notation. There is no need to depict key signatures or note accidentals as in western notation. The next symbol to appear is the first note, a dotted eighth note c' 112, followed by a new note rhythm, a sixteenth c'" 113. These two notes are pickups followed by a barline 114 followed by three quarter notes d'", c' and f'" 115. Since those three notes are the same equal value, only the first note need indicate the rhythm, thus three equal quarter notes are equal to 3/4 in the bar. Going into the second bar a change of rhythm is indicated by introducing a half note e' (stem down and to the left of the notehead) 116.

Towards the end of the first line a barline is shown in the western (traditional) notation 117. However the depiction of a barline is not necessary in the shorthand notation line, it is a given that the symbols have reached the end of the line/phrase. The first note in the second line is the high c'''' 118. Since no holes are covered in that note, it is not necessary to depict any holes whatsoever. At the end of the piece a rest 119 is shown to complete the 3/4 bar followed by a final bar 110 indicating the conclusion of the piece.

A specifically designed repertory may further be included as part of the present invention. This repertory is a specific repertory related to the instrument in which other instruments can also play and participate in. It is designed to provide much needed repertory to a nearly empty reservoir. Several genres are employed to give a wide perspective on music made available for a music playing/listening public.

The creation of an instrument such as the present invention that can be consistently replicated to play in tune at A=440, plus a method and notation system built around such an instrument requires a body of music that fits such a system. Although there are in existence a small group of pieces for a 4-hole pendant instrument in C, most if not all are one-line adaptations of well-known melodies without accompaniments, therefore not original music. Plus, an instrument's limited range of an octave eliminates many pieces altogether. So there is not a specific body of work to fall back upon. Many lesser known instruments have suffered obscurity based on lack of repertory.

The large majority of music repertory available is out of the range of the present inventive instrument. Such examples like Yankee Doodle or The Star Spangled Banner will not fit on the instrument unless the tune is altered.

In order for the system to have a range of depth plus longevity, there has to be a healthy supply of pieces that specifically fits such an instrument in order to meet the need. The repertory of the present invention addresses this need with pieces written specifically not only for the instrument, but adaptable to other instruments capable of playing a major scale of C. Several genres are created to give the instrument versatility. Original music and arrangements are created in 2-6 part ensembles with or without instrumental accompaniments, all of which employ the present notation system and western notation concurrently The repertory is music specifically designed for the instrument discussed herein. The music is essentially miniature compositions of mostly short length. Compositions are designed to be consumed in large numbers to aide the student in sightreading. It can be based on existing pieces to arrange, or original works to fit the instrument.

The inventive repertory contemplated herein is a multi-use system which can be used by numerous instruments capable of reading the G clef. This is possible because the inventive instrument's range is so small any instrument that can play an 8-note scale in C major can play these arrangements. With each piece of music is such short durations means students read from one piece to the next.

The purpose is to provide enough repertory to improve sightreading skills. The best way to improve sightreading is to read from one piece to the next, not practice a piece over and over again. The latter induces memorization. This reperatory of course can be used in that way, but the main purpose is to expose the reader to new challenges/pieces, so the reader is forced to make quick decisions as to what notes come next. Practicing a piece over and over again is a completely different discipline which has little or nothing to do with improving sightreading skills.

As noted, the notation system employs two notation systems. The left hand of the page shows a piece in western notation plus chord symbols for keyboards or plucked strings. The right side of the page employs 2-3 inventive notation parts usually requiring no page turns. The notation page is specifically designed for the player.

Most classical music is unplayable on the instrument of the present invention, but the style can be mimicked and miniaturized to fit the instrument. For example, a style of music can confine itself to a smaller instrument range. Nearly all of J. S. Bach's music has a range too large to fit comfortably on the instrument. But Bach's style can be miniaturized in new composition creations to fit the instrument. These are known as ersatz pieces or imitations. Works consists of duos, trios and large scale works like a concerto for the instrument and orchestra.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A closed end woodwind instrument comprising:
a body defining an internal cavity;
a windway defined by the body connecting the cavity to a mouthpiece area of the body and allowing an air to enter the cavity;
a labium in communication with the windway, the labium splitting a quantity of air flowing through the windway such that a portion of the air flow enters the cavity, and a remainder of the air flow exits a window;
a plurality of tone holes in communication with the internal cavity;
wherein the internal cavity defines a circular cross section;
wherein the body is approximately circular in cross section, and further consisting of four tone holes; a first tone hole in a northwest quadrant of the body, a second tone hole in a northeast quadrant of the body, a third tone hole in a southeast quadrant of the body, and a fourth tone hole in a southwest quadrant of the body;

wherein the first tone hole has a diameter of approximately 6.00 mm+/−0.1 mm at an opening of the internal cavity, second tone hole has a diameter of approximately 5.50 mm +/−0.1 mm at an opening of the internal cavity, third tone hole has a diameter of approximately 1.5 mm+/−0.1 mm at an opening of the internal cavity, and wherein the fourth tone hole has a diameter of approximately 3.00 mm+/−0.1 mm at an opening of the internal cavity.

2. The closed end woodwind instrument of claim 1 wherein each of the four tone holes has a tapering area such that an opening at an exterior of the body is larger than an opening at the cavity, and wherein the first tone hole has an exterior opening of approximately 5.12 mm+/−0.1 mm;

wherein the second tone hole has an exterior opening of approximately 6.44 mm +/−0.1 mm wherein the third tone hole has an exterior opening of approximately 5.62mm+/−0.1 mm and wherein the fourth tone hole has an exterior opening of approximately 4.46 mm+/−0.1 mm.

3. The closed end woodwind instrument of claim 1 wherein a center of the first tone hole is positioned approximately 16.31 mm (+/−1 mm) to the left of a center point of the body, and 6.42 mm (+/−1 mm) up towards the mouthpiece from the center point of the body;

wherein a center of the second tone hole is positioned approximately 17.60 mm (+/−1 mm) to the right of the center point of the instrument, and 5.39 mm (+/−1 mm) up towards the mouthpiece from the center point;

wherein a center of the third tone hole is positioned approximately 13.54 mm (+/−1 mm) to the right of the center point, and 15.65 mm (+/−1 mm) down from the center point away from the mouthpiece; and wherein a center of the fourth tone hole is positioned approximately 12.75 mm (+/−1 mm) to the left of the center point, and 13.65 mm (+/−1 mm) down from the center point away from the mouthpiece.

4. The closed end woodwind instrument of claim 1 wherein a stopping and unstopping of the plurality of tone holes allows a user to produce an octave major scale.

5. The closed end woodwind instrument of claim 1 further comprising an eyelet on an opposite side of the body from the windway, a lanyard connected to the eyelet.

6. The closed end woodwind instrument of claim 1 wherein a diameter of the cavity is approximately 38.14 mm and having a depth of approximately 7.57 mm.

7. The closed end woodwind instrument of claim 3 wherein the mouthpiece area is approximately 5.25 mm wide, and wherein a length of the windway is approximately 15.69 mm, the windway being elevated ramping upward into the cavity, such that an entry of the windway is approximately 5.56 mm from a bottom of the body, and enters the cavity at a height of approximately 7.14 mm from the bottom of the body.

8. The closed end woodwind instrument of claim 1 wherein the body is formed of a bottom piece which defines at least a portion of the windway and the cavity, and a top piece which defines the tone holes, the bottom piece and top piece mated together.

\* \* \* \* \*